(12) United States Patent  
Smith

(10) Patent No.: US 6,493,184 B1  
(45) Date of Patent: Dec. 10, 2002

(54) DEDICATED DISK BURNISHING ZONES FOR BURNISHING MAGNETIC RECORDING SLIDERS

(75) Inventor: Gordon James Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/489,285

(22) Filed: Jan. 21, 2000

(51) Int. Cl.[7] .......................... G11B 5/82; G11B 21/02; G11B 21/21; G11B 5/60
(52) U.S. Cl. ..................... 360/135; 360/237.1
(58) Field of Search ................ 360/31, 135, 128, 360/137, 75, 237.1

(56) References Cited

U.S. PATENT DOCUMENTS

| | | | | |
|---|---|---|---|---|
| 5,086,360 A | * | 2/1992 | Smith et al. | 360/103 |
| 5,863,237 A | * | 1/1999 | Felts et al. | 451/41 |
| 5,880,899 A | * | 3/1999 | Blachek et al. | 360/66 |
| 5,887,366 A | | 3/1999 | Watanabe | 29/603.16 |
| 6,031,697 A | * | 2/2000 | Lee et al. | 360/128 |
| 6,088,199 A | * | 7/2000 | Lee et al. | 360/135 |

FOREIGN PATENT DOCUMENTS

| | | | |
|---|---|---|---|
| EP | 0 231 625 A1 | * | 8/1987 |
| JP | 56-169226 | * | 12/1981 |
| JP | 62-073424 | * | 4/1987 |
| JP | 5-073852 | * | 3/1993 |
| JP | 6-203372 | * | 7/1994 |
| JP | 9-251743 | * | 9/1997 |
| JP | 411133 A | * | 7/1998 |
| WO | 95/12199 | * | 5/1995 |

* cited by examiner

*Primary Examiner*—William Klimowicz
(74) *Attorney, Agent, or Firm*—Freling E. Baker; James R. Nock

(57) ABSTRACT

A magnetic data storage system includes at least one storage disk having a data surface of concentric radial tracks and at least one burnishing track, a drive for rotating the disk; and a slider having an air bearing surface for air support of the slider over the data surface, wherein the burnishing track is a dedicated track for burnishing the slider.

8 Claims, 5 Drawing Sheets

FIG. I

DEDICATED DISK BURNISHING ZONES FOR BURNISHING MAGNETIC RECORDING SLIDERS

BACKGROUND OF THE INVENTION

1. Field of the Invention

The present invention generally relates to magnetic data storage systems and to sliders used in such systems. More particularly, the invention concerns a method and apparatus for burnishing sliders during, as well as after manufacture and assembly of the system.

2. Discussion of the Related Art

A magnetic data storage system typically comprises at least one magnetic disk with at least one data recording surface having a plurality of concentric tracks for storing data. A spindle motor and spindle motor controller rotate the disk(s) at selected revolutions per minute (RPM) such that at least one read/write transducer can read data from or write data to a recording surface. In most current systems, the transducer is supported by an air bearing slider which has a top surface attached to an actuator assembly via a suspension, and a bottom surface having an air bearing design and pads to provide favorable flying height of the slider. During operation of the magnetic data storage system, the air bearing slider is positioned above the desired data track by an actuator assembly.

Recently, the recording density of magnetic disks has dramatically increased. In order to take advantage of the increased density, the flying height of the magnetic head has been reduced to 0.1 µm or less. In fact, systems using continuous contact sliders, in which the sliders stay in touch with the disk during all aspects of operation, have been proposed. In such contact recording systems, the magnetic heads read and write in contact with the magnetic disk. U.S. Pat. No. 5,041,932 and Japanese Patent Application Laid-open No. H5-114116 disclose magnetic head structures suitable for such contact recording and reproducing, and a method of manufacturing such structures.

However, inherent in the contact recording and reproducing system is the abrasion of the magnetic head and the magnetic disk due to the sliding contact between them. This problem may be reduced by using a carbon material in the contact pad portion of the head, a protective layer on the magnetic disk, a reduced weight magnetic head, a reduced load head, and/or a perpendicular magnetic recording system. Nonetheless, wear, uneven surfaces, and debris intrinsic in these contact slider systems shortens their life.

For this reason, some of the more conventional magnetic storage systems use air bearing sliders that operate in a contact start/stop mode. The slider and transducer are only in contact with the recording surface when the spindle motor is powered down. As the disk begins to rotate, an air flow is generated which enters the leading edge of the slider and flows in the direction of the trailing edge of the slider. The air flow generates a positive pressure on the air bearing surface of the slider, and when enough pressure builds up, lifts the slider above the recording surface. As the spindle motor reaches the operating RPM, the slider is maintained at a nominal flying height over the recording surface by a cushion of air. Subsequently, as the spindle motor spins down, the flying height of the slider drops until the slider is once again in contact with the disk.

However, due to the slider dragging on the disk surface during start and stop operations, these air-bearing systems, the resulting wear (also referred to as wear durability), unevenness, and debris on the disk and slider surfaces severely reduces system life. Moreover, the entire system may "crash" (ie. the system becomes nonfunctional due to damage) if such contact causes damage to a critical part of the disk or slider, or creates debris that becomes caught between the slider and disk or other crucial components. Additionally, protrusions or uneven slider surfaces created by contact may cause read/write errors, further disk wear, and crashes. Similarly, slider/disk contact may cause improper slider flying height due to inadvertent burnishing, buildup of debris on the slider, or changes in the flight characteristics of the slider.

The flying height of the slider transducer head above the disk is critical for mechanical and magnetic performance. Transducer heads flying too high perform poorly magnetically, for example, providing a readback signal with reduced amplitude, a reduced signal to noise ratio and a reduced resolution for bit detection. On the other hand, transducer heads flying too low are more likely to pick up contamination from the disk that will lead to smears on the heads and to an increase of the hazard of head crashes. One approach to circumvent the undesirable issues associated with wear, durability, and improper flying height is to use load/unload technology.

Typical load/unload technology includes a ramp for the slider/suspension assembly at the outer diameter of the disk where the slider is "parked" securely while the spindle motor is powered down. During normal operation, the disk speed is allowed to reach a selected RPM (which may be below the normal operating RPM) before the head is "loaded" from the ramp onto the disk. As the slider approaches the disk surface, an air cushion is generated by the disk's rotation. The slider can also be "unloaded" from the disk's surface onto the ramp. In this manner, the slider is positioned over the disk without substantial contact with the disk surface. By reducing the contact between the slider and the disk surface, the interface life can be increased. Nonetheless, even with the load/unload system's reduced contact, the system still risks the dangers cited above because there is frequently some slider/disk contact during start and stop, there is always slider/ramp contact when the spindle motor is powered down, and there is a possibility of more harmful contact if a bumpy load or unload occurs.

In order to reduce the risks cited above as well as properly position the slider (transducer) above the disk surface, manufacturers of the systems often burnish the sliders before assembly. For instance, burnishing has been performed during manufacture in order to obtain a thin-film head slider with stable flying characteristics and good running durability. This is accomplished by polishing the medium-facing slider surface, which constitutes the air bearing surface. Such burnishing decreases the flying height of the slider and evens the air bearing surfaces by wearing flat and burning-in the slider's air bearing surfaces. Similarly, such burnishing or pre-conditioning of the sliders reduces the likelihood of disk or slider damage because the process removes sharp protrusions and rounds sharp corners significantly reducing the stress imparted on to the disk by the slider and vice versa. Japanese Patent Public Disclosure No's. Sho 60-185272, Sho 63-70918, Hei 2-199614, Hei 2-212057, Hei 2-301014 disclose polishing films and polishing tapes used during manufacture to polish the air bearing surfaces of sliders. Similarly, a method of preliminary burnishing of contact type magnetic heads during manufacture has been proposed in U.S. Pat. No. 5,887,336. Yet, this proposal only addresses burnishing contact type heads by using an non-lubricated area covering the full circumference of the disk during manufacturing or prior to a normal recording and reproducing.

Unfortunately, pre-conditioning contact sliders or air bearing sliders during manufacture can not cure problems that occur as a result of slider/disk contact that happens after manufacture. Furthermore, burnishing of air bearing sliders during manufacturing creates numerous other setbacks. First, because all air bearing sliders are assumed to burnish at about the same rate, those sliders that require significantly less or more burnish time will have degraded flying characteristics due to excessive or insufficient burnishing. Out of a batch of sliders, this portion can be significant. Second, this approach assumes that the burnishing occurs only initially, when the sliders are conditioned during manufacture, when in fact, burnishing might occur as a result of slider disk contact at any time resulting in incorrect flying height. In particular, if additional burnishing occurs, the flying height of the heads may be too high to allow reading of previously written data, resulting in hard read errors. Finally, over burnishing after system assembly utilizing the disk surface can burn through the air bearing pads, exposing harder, rougher, and/or more jagged structure. This will disturb the overall disk surface by causing scratches, debris trails, carbon wear tracks, or other deleterious effects that may cause a crash, impact long term slider flyability, or deter from disk surface life.

Disk drives that crash or are seriously damaged during use are infrequently repaired due to repair costs which usually exceed the value of the drive. Furthermore, expensive data and time can be lost when the drive goes bad.

Therefore, there is a need for the ability to monitor burnishing during manufacture to avoid over or under-burnishing. Similarly, there is a need for the ability to burnish after manufacture to prevent crashes and extend system life by removing uneven surfaces, protrusions, and debris that develop in systems after manufacture. Moreover, the ability to burnish during the life of the system will allow users to repair incorrect slider flying height which will increase system performance and life.

SUMMARY OF THE INVENTION

It is a primary object of the present invention to provide means to burnish the slider after manufacture to prevent crashes and extended system life by removing uneven surfaces, protrusions, and debris that develop in systems after manufacture.

Another object of the present invention is to provide means to burnish during the life of the system will allow users to repair incorrect slider flying height which will increase system performance and life.

In accordance with a primary aspect of the present invention a magnetic data storage system comprises a storage disk having a data surface of concentric radial tracks and a burnishing track, means for rotating said disk, and at least one slider having an air bearing surface for air support of said slider over said data surface, wherein said burnishing track is a dedicated track for burnishing said slider.

Another aspect of the present invention is that the burnishing track is segmented into at least one burnishing zone and at least one monitoring.

BRIEF DESCRIPTION OF THE DRAWINGS

The nature, goals, and advantages of the invention will become more apparent to those skilled in the art after considering the following detailed description when read in connection with the accompanying drawings in which like reference numerals identify like elements throughout, wherein.

DETAILED DESCRIPTION OF THE PREFERRED EMBODIMENTS

Figure 1:
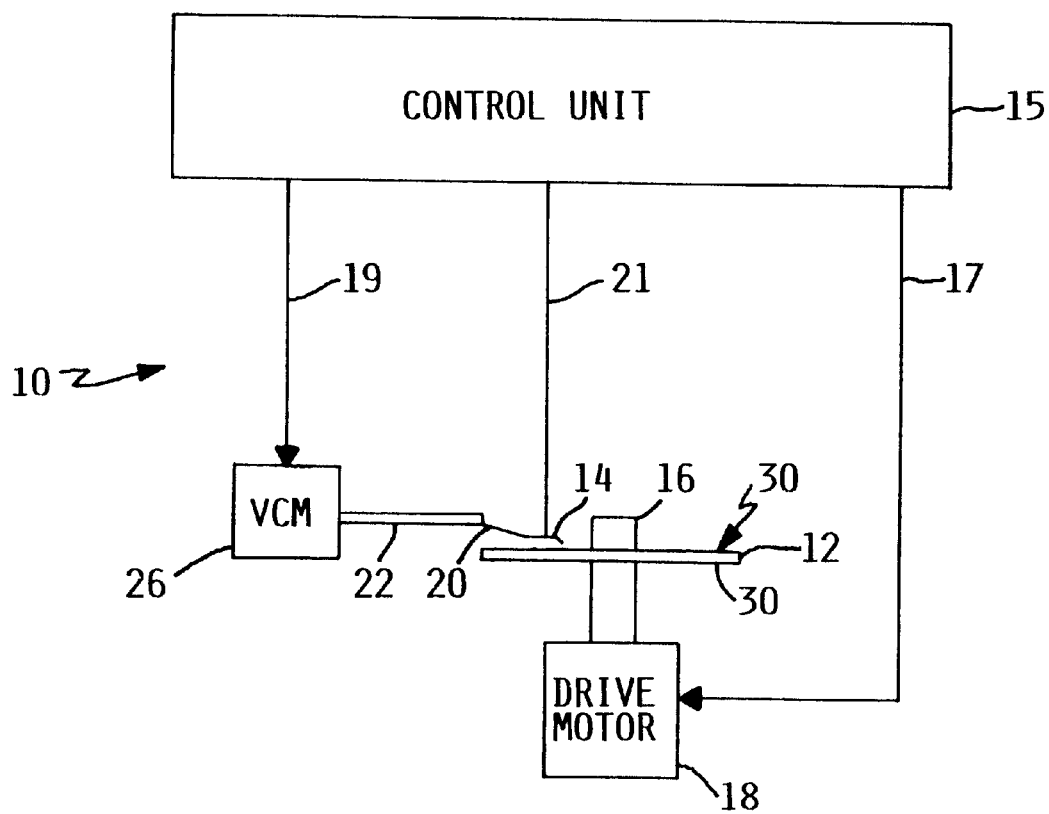
FIG. 1 is a schematic illustration of a typical data storage in which the invention is embodied.

FIG. 1, is a schematic illustration of a typical magnetic data storage system designated generally at 10 that incorporates a novel burnishing apparatus and method of employing same. The illustration shows a magnetic storage disk 12, a slider 14 which carries read and write transducers (not shown), a spindle 16 on which the disk is mounted and a motor 18 for driving the spindle. The slider 14 having one or more magnetic transducers is mounted by means of a suspension member 20 on a rotating actuating arm 22 and positioned above the disk for writing data to and reading data from the disk. The suspension member 20, preferably provides a slight spring force which biases the slider towards the disk surface. The slider is preferably a flying slider which rides or flies on a cushion of air above the disk. The actuating arm 22 is pivotally mounted and driven by a voice coil 26 that is positioned in a magnetic field created by a permanent magnet.

The components of the magnetic storage system of the invention are controlled by signals generated by and received from a control unit 15. The control unit may include various logic control circuits, memory devices and a microprocessor. The control signals include motor control signals carried on line 17 and slider position control signals carried on line 19 to selectively position the slider on the disk. Read and write signals are generated by the control unit and transmitted via line 21. The control unit may also control and monitor burnishing via line 21.

Figure 2:
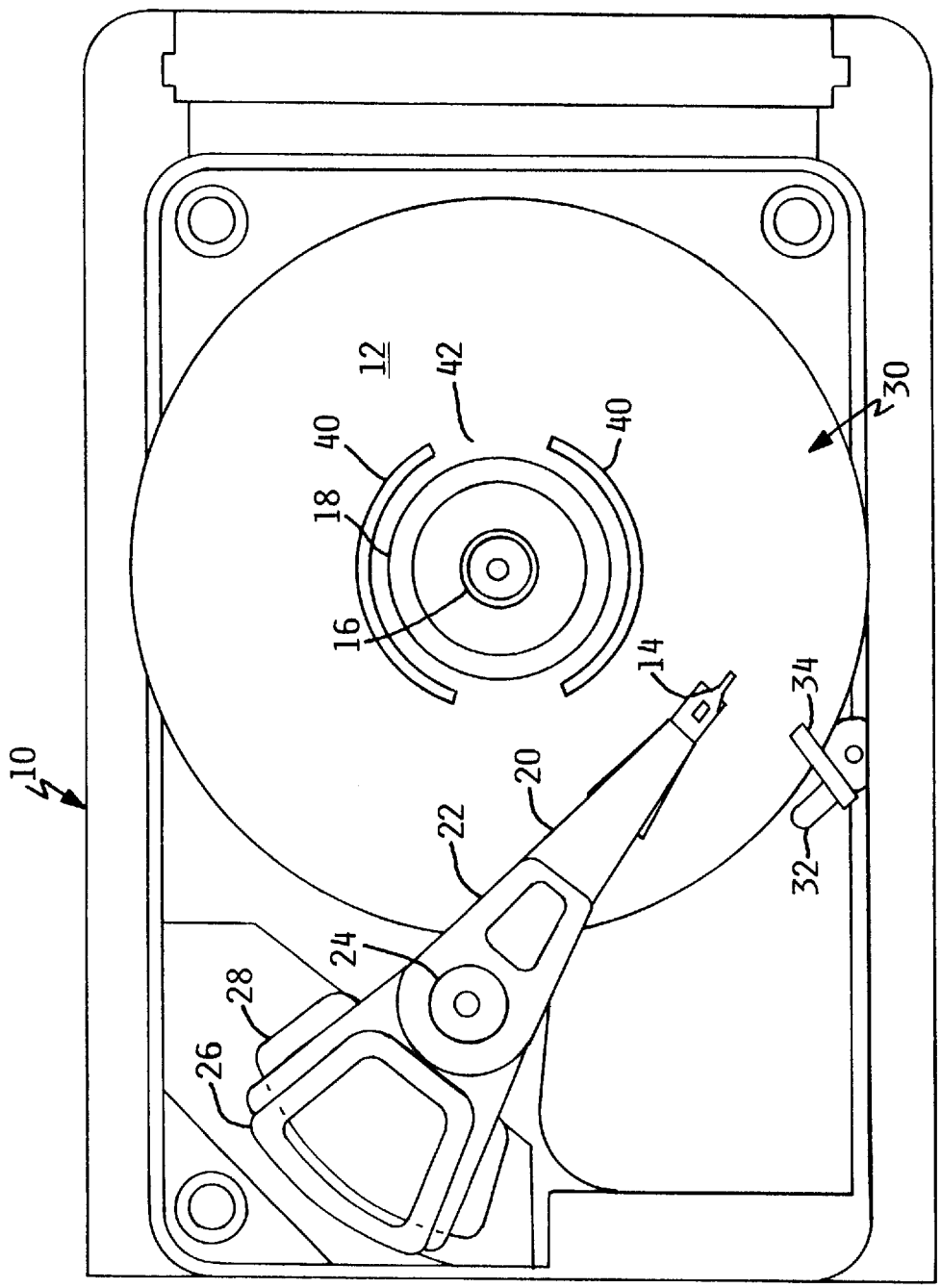
FIG. 2 is a plan view of a typical small drive illustrating one embodiment of the invention.
Figure 3:
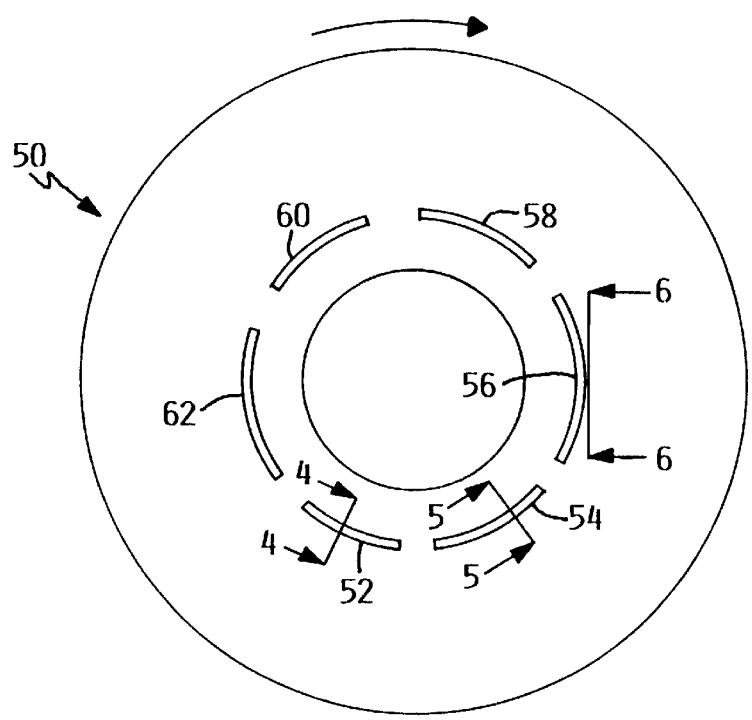
FIG. 3 is a plan view of a disk with an alternate embodiment of the invention.

FIG. 2 of the drawings, illustrates a top plan view of the disk unit of the magnetic storage system of FIG. 1 incorporating a preferred embodiment of the invention. The system illustrated in FIG. 2 comprises a data storage disk 12, and a transducer carrying head or slider 14 mounted by means of a suspension member 20 associated with rotating actuating arm 22. Optionally, the system 10 may read and write on both sides of the disk and may include multiple disks, where each disk surface may have multiple sliders, and where each slider may have multiple transducers.

The actuating arm 22 is mounted on a bearing 24 and driven by a voice coil 26 that is positioned in a magnetic field created by a permanent magnet 28. As the disk rotates, the slider is moved by the actuator 22 in an arc path above the disk surface 30 in order to access the data tracks. The direction and velocity of movement of the actuating arm by the voice coil, and the disk drive motor are controlled by the control unit as previously discussed. Actuator movement may be limited by one or more crash stops blocking the movement of the actuating arm at or near the inner and outer diameters.

The surface of the storage disk 30 in accordance with one embodiment of the present invention, is formed with at least one burnishing track having at least one burnishing zone 40 and at least one non-burnishing zone 42 as illustrated in FIG. 2. In accordance with a preferred embodiment of the invention, the burnishing track is formed with two or more burnishing zones 40, and two or more non-burnishing zones 42. The burnishing zone 40 preferably has a surface roughness greater than that of the data surface zone 30. The non-burnishing zones 42 are preferably monitoring zones for measuring the height of the slider during burnishing. The burnishing track may be anywhere on the disk, but is best located at the innermost diameter (ID) of the disk against the stop.

Burnishing is carried out by positioning the slider above the burnishing track and rotating the disk until the desired degree of burnishing is achieved. Engagement of the bottom surface of the slider with the burnishing surface of the burnishing zone wears the surface of the slider down until the desired flying height of the slider is achieved. The height of the slider may be monitored as it passes over the non-burnishing or monitoring zones of the track. Monitoring can be carried out by writing and reading data to and from the disk as burnishing is carried out.

The burnishing track is preferably located near the inner diameter (ID) of the disk 12. Location of the track near the ID of the disk takes up significantly less magnetic medium area 30 because of the smaller diameter. In fact, it is possible for the burnishing track to take up less than 2% of the disk storage capacity because of the lower data rates and densities around the inside track. Also, for a system using load/unload technology 32, the loading and unloading of a slider is usually performed from the outer diameter (OD) of the disk 12. By locating the burnishing track near the ID of the disk, it is not necessary to cross over the burnishing track when starting or stopping use of disk. This avoids inadvertent burnishing and unnecessary wear of the slider air bearing surface.

Alternatively, it is possible to have a burnishing track near the outer diameter (OD) of the disk 12. One advantage of this configuration is that loose lubricant or debris resulting from burnishing will not spread along the disk surface 30 and interfere with operation. Instead, due to centrifugal forces, these potentially harmful elements will spin-off of disk's edge. Having the burnishing track near the OD also gives the burnishing zones 40 a higher thermal threshold because heat generated on the disk 12 due to burnishing is spread out over a larger burnishing track.

The present invention was devised for an air bearing slider, but is also applicable to contact type sliders. During operation of the system 10, the rotation of the disk 12 generates an air cushion between the air bearing slider 14 and disk surface 30 which exerts an upward force or positive pressure on the lower surface or air bearing surface of the slider. The air bearing surface may include a plurality of air bearing rails or pads shaped to provide the desired flying characteristics. The positive pressure generated on these pads counterbalances the slight spring force of suspension 20 and supports the slider 14 off and slightly above disk surface 30 by a small, substantially constant spacing. The slider shape may also include negative pressure regions for counteracting the positive pressure in order to provide more stable flying characteristics.

In order to keep the slider 14 from contacting the disk surface 30 during startup and stop, a load/unload structure 32 may be used to lift and park the slider when the disk is not in operation. The load/unload structure 32 usually has a ramp 34 to support the slider off the disk. The ramp is usually located at the outer diameter (OD) of the disk 12 as shown in FIG. 1. During normal operation, disk rotation is allowed to reach a selected speed before the slider 14 is "loaded" from the ramp 34 onto the disk. As the slider 14 approaches the disk surface 30, an air cushion between the air bearing pads 52 and the disk surface 30 is generated by the disk's rotation. The slider can also be "unloaded" from the disk's surface 30 onto the ramp 34 as the disk is rotating. A typical load/unload device is more particularly described in U.S. Pat. No. 5,973,870, which is incorporated herein by reference as though fully set forth.

Burnishing or burning-in of the slider's air bearing surfaces is done initially during manufacture in order to achieve even air bearing surfaces and correct slider 14 flying height. Sliders are burnished to allow for proper positioning of the slider (transducer) above the disk magnetic medium surface 30. Transducer heads flying too high perform poorly magnetically and transducer heads flying too low are more likely to pick up contamination from the disk that will lead to smears on the slider 14 heads and to an increase of head crashes. Burnishing during manufacture is performed in order to obtain a thin-film head slider with stable flying characteristics and good running durability. This is accomplished by polishing the medium-facing slider surface which constitutes the air bearing surface. Burnishing of the sliders reduces the likelihood of disk or slider contact damage because the process removes sharp protrusions and rounds sharp corners of the slider 14, significantly reducing the stress imparted on to the disk by the slider and vice versa. Burnishing may also be done when necessary subsequent to manufacture, during normal recording and reproducing operation to reduce disk/slider contact damage by removing slider uneven surfaces, protrusions, and debris that develop after manufacture and interfere with system functionality or life. The purpose of providing a disk with a dedicated burnishing track is to 1) allow the flying height of the slider to be adjusted, 2) allow the slider air bearing surfaces to be cleaned, and 3) allow the slider air bearing surfaces and pads to be worn evenly when desired.

According to the preferred embodiment, the slider air bearing surface is positioned above the burnishing zone 40 to initiate burnishing. The flying height of the slider may be decreased and the air bearing surfaces and/or pads are worn even by the burnishing zone(s) 40. In some designs it may be desirable to lower the slider flying height by reducing the disk speed until the slider comes off of it's air cushion. Then, when the slider air bearing pads contact the burnishing zone 40, the pads are worn down. While the surface or pads are worn down, the friction simultaneously heats and polishes, or "burns" them in. Once the slider is sufficiently burnished, disk rotation speed is increased until the slider is flying again. The slider then returns to normal operation.

Alternatively, the burnishing zone 40 may be higher than the magnetic medium surface 30. In this embodiment, burnishing will occur whenever the slider's air bearing pads are moved above the burnishing zone 40. The disk speed need not be altered. Once the slider 14 traverses into the burnishing track, it comes in contact with the burnishing zone 40 surface and begins to wear down and burn-in. Then, after the slider is sufficiently burnished, it can simply be moved off of the burnish track and used again in normal operation.

In addition to at least one burnishing zone, the disk surface of the present invention is also provided with at least one non-burnishing zone 42. For instance, in accordance with the preferred embodiment of the invention, as shown in FIG. 2, the burnishing track is segmented into two burnishing zones 40, and two non-burnishing zones 42. The non-burnishing zone or zones can be used to monitor or measure slider height as a result of the burnishing process during burnishing by any combination of magnetic, thermal, or resistive properties of the slider read and/or write elements. This monitoring is necessary in order to avoid excessive or insufficient burnishing. Monitoring can be performed with every disk revolution or after a number of revolutions. For optimum results, burnishing should be evaluated as the slider passes over every non-burnishing or monitoring zone or with every disk revolution.

In one embodiment, the monitoring zone is a continuation of the data surface zone. A data surface monitoring zone can be used to determine flying height of the slider during burnishing by providing a readback signal resulting from writing data to and/or reading data from the zone to the control unit 60 via the monitoring signal line 66. Readback signal methods include harmonic ratio flying height clearance tests and readback digital sampling of a predetermined encoded pattern. During the later method, slider 14 transducers are positioned to read from a predetermined region or monitoring zone on the disk surface 30 to obtain a readback signal. Preferably, the predetermined area is one which is normally not rewritten during operation of the system. Such methods are more particularly described in U.S. Pat. No. 5,168,413. Monitoring of a magnetic pattern recorded on the data zones between the burnishing zones during the burnish can be used to insure that the correct flying height has been achieved when optimal data writes and reads have been achieved. For instance, in the embodiment illustrated in FIG. 2, the slider air bearing surface could be burnished as each burnishing zone 40 passes beneath the slider and the burnishing results monitored as each non-burnishing zone 42 or data surface monitoring zone passes beneath the slider.

Monitoring can also be achieved by the thermal response of a slider 14 magneto resistive (MR) head which is checked for the numerous expected thermal transients. When these transients disappear almost completely after the head is flying and has ceased to contact the disk surface in the burnishing track surface, the burnishing is complete. Thermal transients are more frequent when the head or slider 14 is in the burnishing zone 40 than in the smooth data zone 30 because of the greater roughness of the burnishing zone. Thus, a better signal-to-noise ratio is provided in the measurements sent to the control unit 15 via the monitoring signal line 21. This improves the ability to gauge the burnish rate because once the slider is sufficiently burnished there are almost no resulting thermal transients when the head flies over the a data zone. Optionally, for embodiments where the burnish zone 40 is higher than the disk surface 30 (as discussed below), thorough burnishing is indicated when the thermal transients sent to the control unit 15 via the monitoring signal line 21 are negligible compared to when burnishing began.

A non-segmented burnishing track can provide effective burnishing if the sliders are at the inner diameter (ID) stop, because radial motion is still possible. The amount of radial motion at the ID stop available is proportional to the compliance of the stop and the amount of actuator force available. The radial motion aids in positioning the slider head correctly over the track as well as increasing the speed at which burnishing will occur because of increased friction caused by movement of the slider tangential to the burnishing track. Burnishing can be monitored by the thermal response of a slider for full track circumference burnishing zone configuration via the feedback signal sent to the control unit 15 via monitoring signal line 21.

The burnishing zone 40 which may be segmented or may extend around the entire circumference of the burnishing track can have a surface roughness equal to or greater than that of the normal disk surface or magnetic storage medium 30. For instance, a burnishing zone 40 with a roughness greater than the normal disk surface 30 is used to assure that the rate of burnishing is faster than if the normal disk surface 30 is being used. A rougher burnishing zone is also a better repository for any wear debris that may be generated during burnishing.

Additionally, a burnishing zone is preferably provided with sufficient lubricant to confine or contain wear debris resulting from burnishing in the burnish zone 40. The advantage of this embodiment is that it keeps any protrusions or debris removed from the slider from interfering with the magnetic medium or other system components.

The burnishing zone is also preferably harder than the normal magnetic disk surface. The advantage of this embodiment is that it allows for shorter burnishing times and assures that the wear and burnishing occur on the slider 14, not the disk 12. Optimally, the hardness of the burnishing zone 40 should be greater than that of the slider air bearing surface or pads; and the air bearing surface or pads should be harder than the magnetic medium or disk surface.

The radial width of the burnishing track or zones may vary. Preferably, the burnishing zone is slightly greater in width than the slider air bearing surface. In some instances the burnishing track or zone may only be as wide as the largest of the air bearing pads on the slider. However, burnishing zone(s) not as wide as the width of the slider air bearing surface may be used. For instance, burnishing with a burnishing zone 40 that is not as wide as the slider air bearing surface 50 requires monitoring using tracks running beside the burnishing zone 40. For example, during the burnishing process, it is possible to write data to and/or read data from tracks adjacent to the burnishing zone. Alternatively, detailed burnishing may be done with a burnishing zone 40 not as wide as the narrowest air bearing pad of the slider by moving the slider radially across the burnishing zone under operation of the control unit for proper burnishing of the various air bearing pads or portions thereof. Monitoring methods similar to those employed for the segmented burnishing track monitoring methods detailed above can be used to provide the control unit 60 with monitoring signals via 21. For example, use of a burnishing zone 40 not as wide as the slider air bearing surface can be maintained by use of a readback signal which can be used to perform harmonic ratio flying height clearance tests, digital sampling of a predetermined encoded pattern, or optimal data writes and reads to insure that the correct flying height has been achieved. Alternatively, the burnishing zone 40 not as wide as the slider air bearing surface can be segmented and/or use other monitoring methods mentioned.

Burnishing tracks may be designed with zones or segments having a radial and tangential curvature in order to shape the slider air bearing surface and/or pads into the desired geometry. For example, zones with a curved, sloping or grooved profile can be used to generate a desired air bearing pad contour. Similarly, a burnishing zone 40 with a negative or concave radial and tangential curvature will result in a positive camber for the air bearing pad. This can produce a slider having a higher flying height away from the slider read and write elements thereby reducing head-disk interference with disk surface asperities.

FIGS. 3–7 illustrate an exemplary embodiment of a disk having burnishing zones of various slopes for contouring the slider air pad surfaces. The disk designated generally by the numeral 50 is provided with a burnishing track near the inside diameter thereof that is divided into segments or zones. In accordance with this embodiment of the invention, a series of zones are provided which have different contours each for generating a particular contour feature on the air-bearing surface of the slider as will be described. The burnishing track is divided into the six different burnishing zones 52, 54, 56, 58, 60 and 62 each covering a sector of about 50 degrees with about a ten degree monitoring zone in between.

Figure 4:
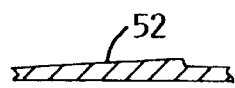
FIG. 4 is a view taken on line 4—4 of FIG. 3.

The burnishing zone 52 has a profile or cross-sectional configuration as illustrated in FIG. 4 which slopes towards the axis of the disk. The slope is preferably on the order of about five to ten degrees and, assuming the disk rotates in a clockwise direction, the slider air bearing surface will be burnished on its outer edge to a larger degree than its inner edge. This can have the effect of rounding off the lower outer corner of the slider's air-bearing surface.

Figure 5:
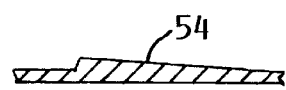
FIG. 5 is a view taken on line 5—5 of FIG. 3.

The burnishing zone 54 has a profile or cross-sectional configuration as illustrated in FIG. 5. The zone or segment 54 is sloped in the opposite direction from that of segment 52. Burnishing zone 54 will have the effect of burnishing the inside lower edge or corner of the slider's air-bearing surface. Thus, with this arrangement the air bearing surface lower edges are alternatively burnished.

Figure 6:
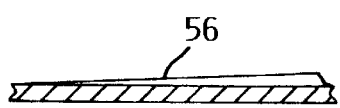
FIG. 6 is a view taken on line 6—6 of FIG. 3.

In order to burnish the forward lower edge of the air-bearing surface a slightly inclined ramp-type burnishing zone is required. This is illustrated in FIG. 6. In this illustration the burnishing zone is formed in the form of a ramp slightly inclined upward so that the slider rides up on the surface as the disk rotates. The above discussed zones may then be repeated in the same order with zones 58, 60 and 62.

Figure 7:
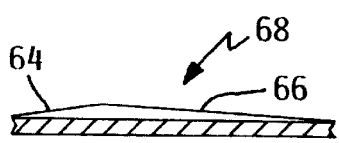
FIG. 7 is a view like FIG. 6 of an alternate construction.

FIG. 7 illustrates burnishing the trailing edge of the slider air-bearing surface using a zone having a downwardly sloping ramp-type configuration. This sector or zone designated generally by the numeral 68 is provided with a short steep up ramp 60 which the forward edge of the slider first encounters and then a longer downwardly sloping ramp 66 which engages and burnishes the trailing edge of the slider air bearing surface as the disk passes under the slider. While cambering the trailer edge of the slider air-bearing surface is not as critical as cambering the leading and side edges, it may be desirable in some instances to do so.

Figure 8:
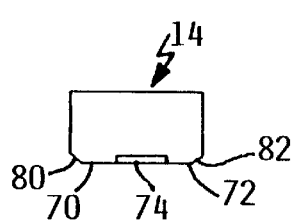
FIG. 8 is an end elevation view of a typical air bearing slider.
Figure 9:
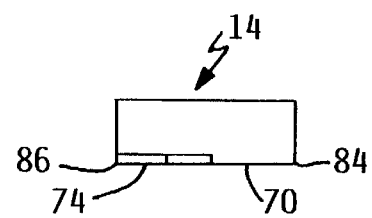
FIG. 9 is a side elevation view of the slider of FIG. 8.
Figure 10:
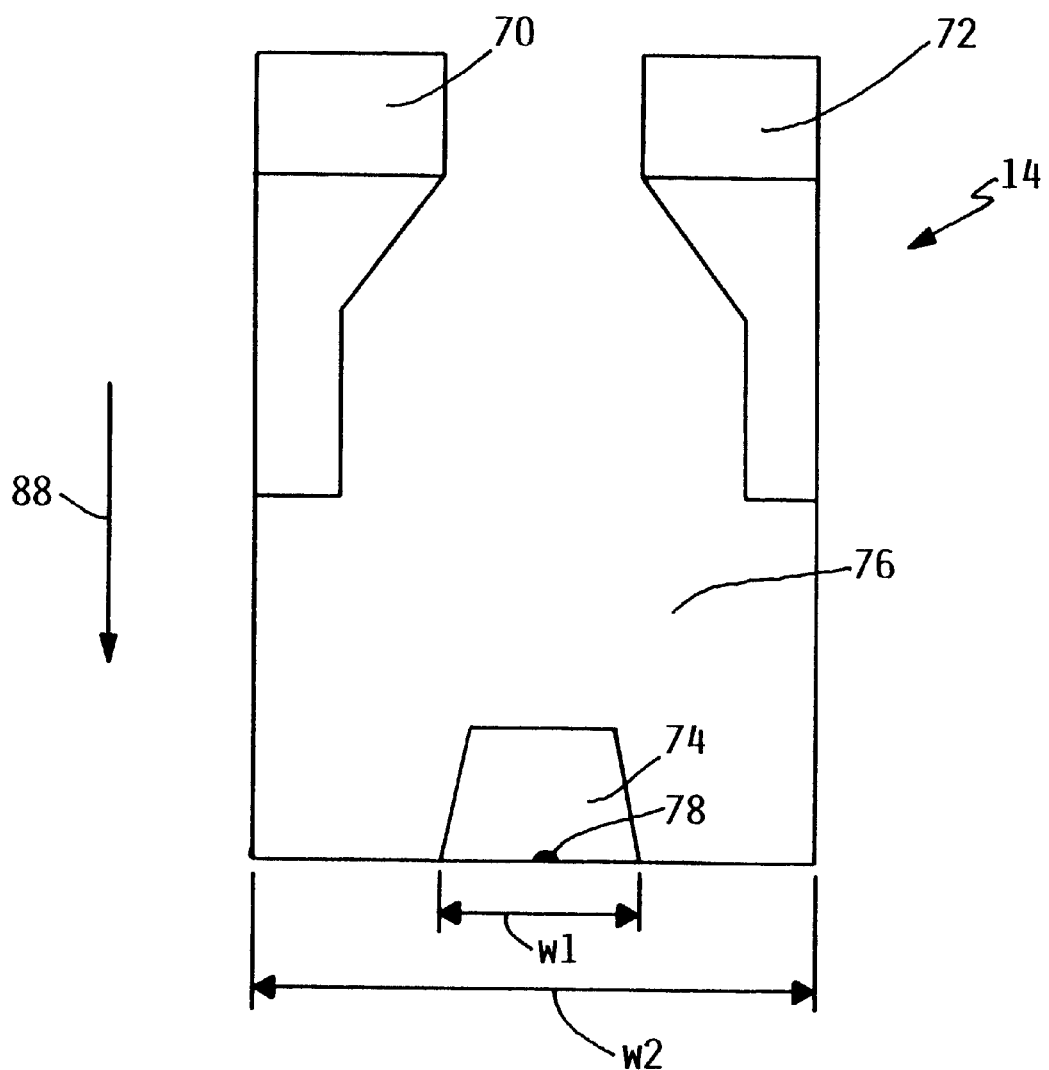
FIG. 10 is a bottom plan view of the slider of FIG. 8.

Referring to FIGS. 8 through 10, there is illustrated an exemplary embodiment of slider 14 in front view in FIG. 8, side view in FIG. 9 and bottom view in FIG. 10. The slider has front air-bearing surfaces 70 and 72 and a rear air bearing pad 74. These surfaces create a positive pressure during operation while an etch cavity 76 provides a negative pressure. The read and write elements 78 are located near the rear edge of air bearing pad 74. These opposing pressures stabilize the slider and read write elements close to the disc surface. It is desirable to locate said elements 78 as close as possible to the surface 30 of the magnetic disk which has a surface velocity relative to the slider. To this end, slider 14 normally floats above the disk surface 30 at a slightly positive pitch angle such that rear pad 74 is closer to the disk surface than the front air bearing pads 70 and 72. The width w-1 of the rear air bearing pad 74 at its trailing edge is sufficient to accommodate the read and write elements and associated magnetic structure. The overall width w-2 of slider 14, is sufficient to provide lateral dynamic stability during operation.

The front air-bearing surfaces, in accordance with one aspect of the invention, are formed with rounded side edges shown at 80 and 82. As shown in side view in FIG. 9, the slider has a forward rounded edge 84 and a trailing rounded edge 86. This is exemplary of contouring of the air-bearing surface that can be achieved with burnishing track sections such as illustrated in FIGS. 4 through 7. Therefore, a burnishing track may be formed with burnishing zones of any or all of the aforementioned configurations or variations thereof. Such a track may be segmented or continuous. Moreover, the burnishing surface could also be curved rather than merely sloped. In some instances, it may be desirable to have more than one burnishing track to achieve the preferred results. In fact, any combination of the mentioned burnishing zones and/or non-burnishing zones in any track or combination of tracks may be employed.

Figure 11:
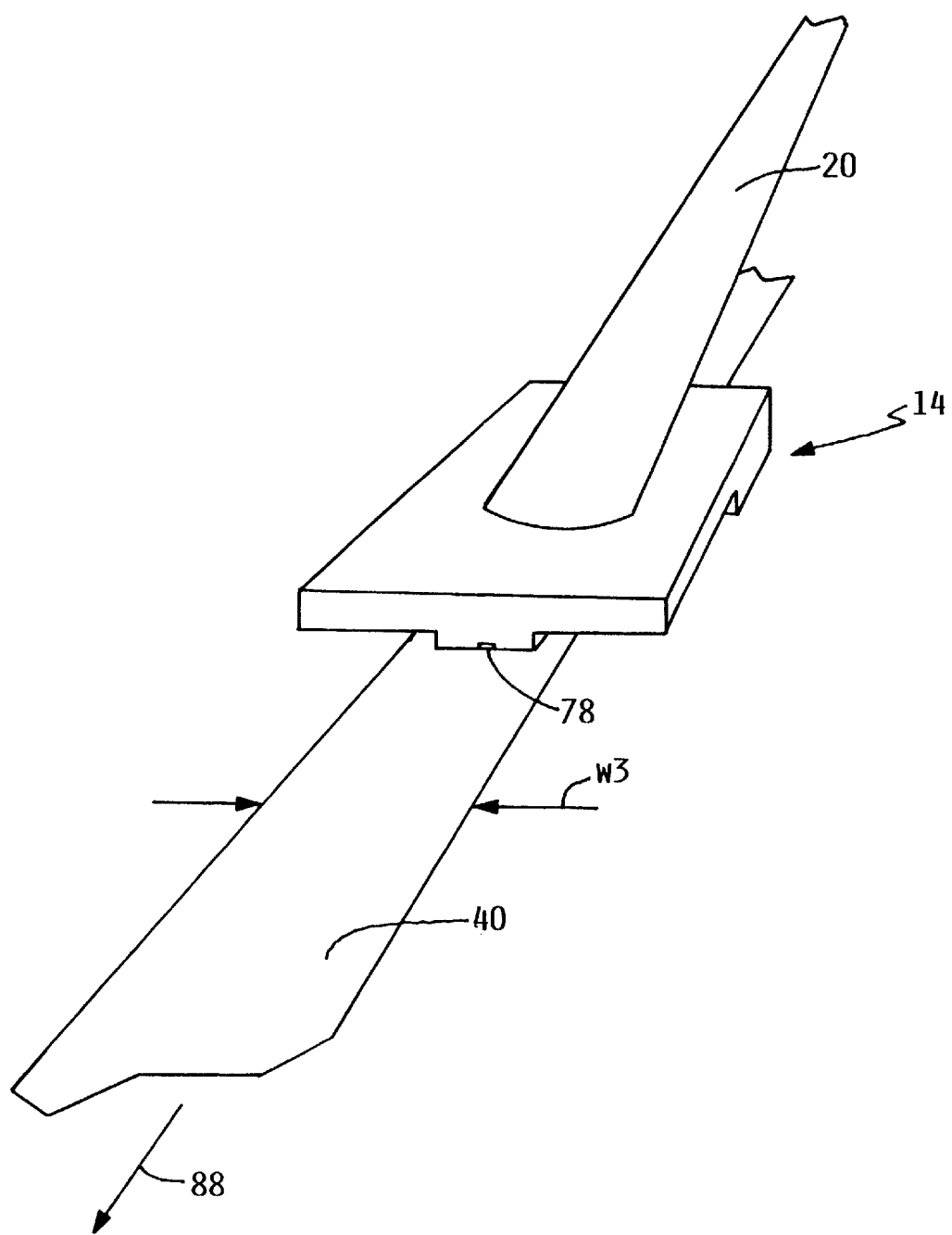
FIG. 11 is a perspective view of the slider of FIG. 8.

Referring to FIG. 11 a perspective view shows slider 14 floating above the surface 30 of the spinning disk and being held in position through suspension 20 where the disk surface 30 is moving in direction 88. The read and write elements 78 float above a burnish zone 40 having a width w-3.

A number of methods may be used to produce a disk 12 having a data storage medium 30 and burnishing track or zone 42 with a different surface roughness. For instance, for a disk with a substrate of aluminum alloy, the substrate is polished using a polishing pad or a buff tape while a slurry of alumina, silicon carbide or diamond is supplied so that the whole surface of the substrate has a predetermined small surface roughness. Polishing may be performed on the portion of the disk surface to become the burnishing area 40 until the desired surface roughness is achieved. For disks with a glass substrate, the burnishing area can be formed partially by using a laser texturing method such as that disclosed in U.S. Pat. No. 5,062,021. Similarly, a burnishing area can be formed on a smoothed glass substrate by irradiating the area with laser pulses to form number of minute lands on the glass substrate. Each minute land will take the form of a ring. The diameter, height, and density of the rings can be adjusted to create the desired burnishing characteristics.

Other Embodiments

Certain preferred embodiments have been described above. It is to be understood that a latitude of modification and substitution is intended in the foregoing disclosure, and that these modifications and substitutions are within the literal scope—or are equivalent to—the claims that follow.

Accordingly, it is appropriate that the following claims be construed broadly and in a manner consistent with the spirit and scope of the invention herein described.

We claim:

1. A magnetic data storage system comprising:

at least one storage disk having a data surface of concentric radial tracks and at least one burnishing track, wherein said burnishing track is segmented into at least one lubricated burnishing zone and at least one non-burnishing zone, and wherein the at least one non-burnishing zone is a monitoring zone;

means for rotating said disk; and at least one slider having an air bearing surface for air support of said slider over said data surface, wherein said burnishing track is a dedicated track for burnishing said slider.

2. A magnetic data storage system according to claim 1 wherein said lubricated burnishing zone is provided with sufficient lubricant to confine/contain wear debris in the lubricated burnishing zone.

3. A magnetic data storage system according to claim 1 wherein at least one burnishing zone surface slopes toward the disk axis and wherein at least one burnishing zone surface slopes away from the disk axis.

4. A magnetic data storage system according to claim 1 wherein at least one burnishing zone surface slopes along the direction of movement of the burnishing track.

5. A disk for use in a magnetic data storage system comprising a flying slider, said disk comprising:

a data surface of concentric radial tracks defining a recording and reproducing zone; and at least one dedicated burnishing track for burnishing said flying slider, wherein said burnishing track is segmented into at least one lubricated burnishing zone and at least one non-burnishing zone, and wherein the at least one non-burnishing zone is a monitoring zone.

6. A disk according to claim 5 wherein said lubricated burnishing zone is provided with sufficient lubricant to contain/confine wear debris in the lubricated burnishing zone.

7. A disk according to claim 5 wherein at least one burnishing zone surface slopes toward the disk axis and wherein at least one burnishing zone surface slopes away from the disk axis.

8. A disk according to claim 5 wherein at least one burnishing zone surface slopes along the direction of movement of the burnishing track.

* * * * *